No. 748,392. PATENTED DEC. 29, 1903.
H. L. MANNING.
PIE MAKING MACHINE.
APPLICATION FILED SEPT. 18, 1903.
NO MODEL. 8 SHEETS—SHEET 4.
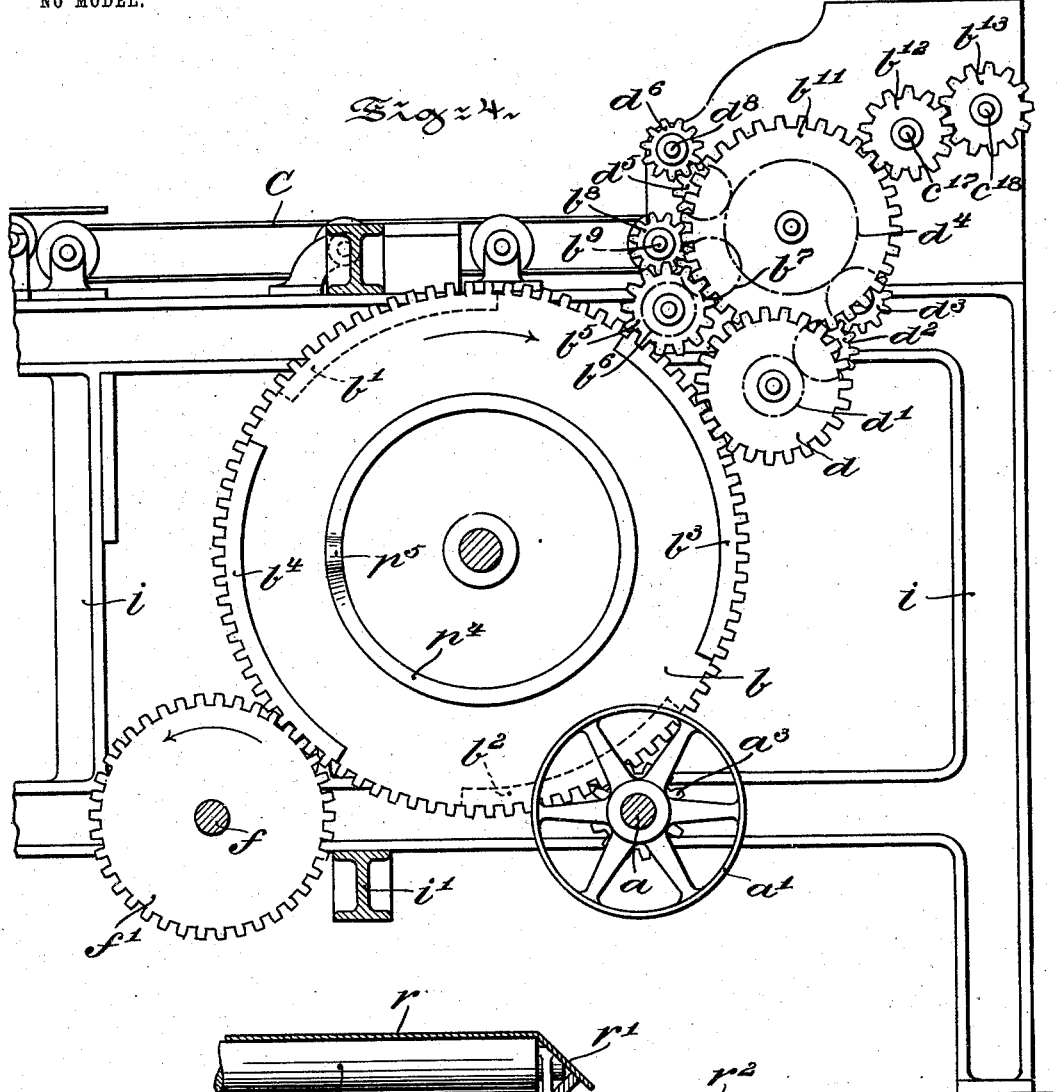
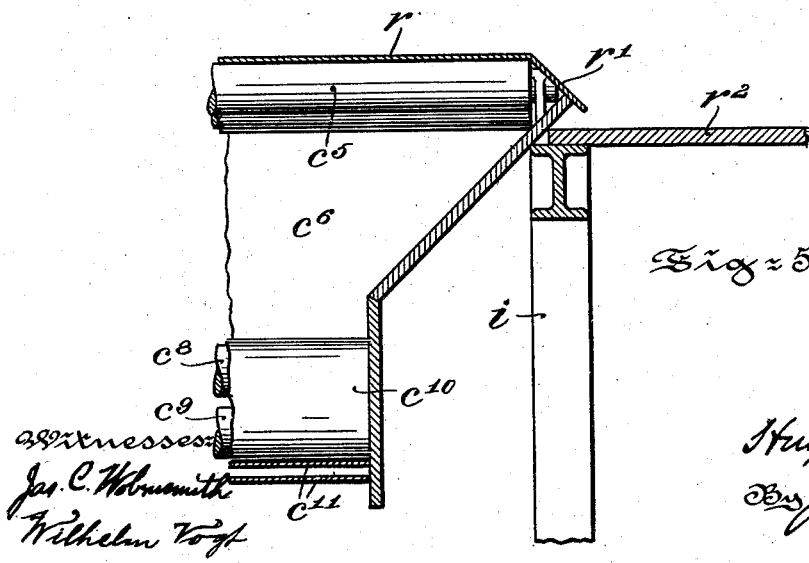

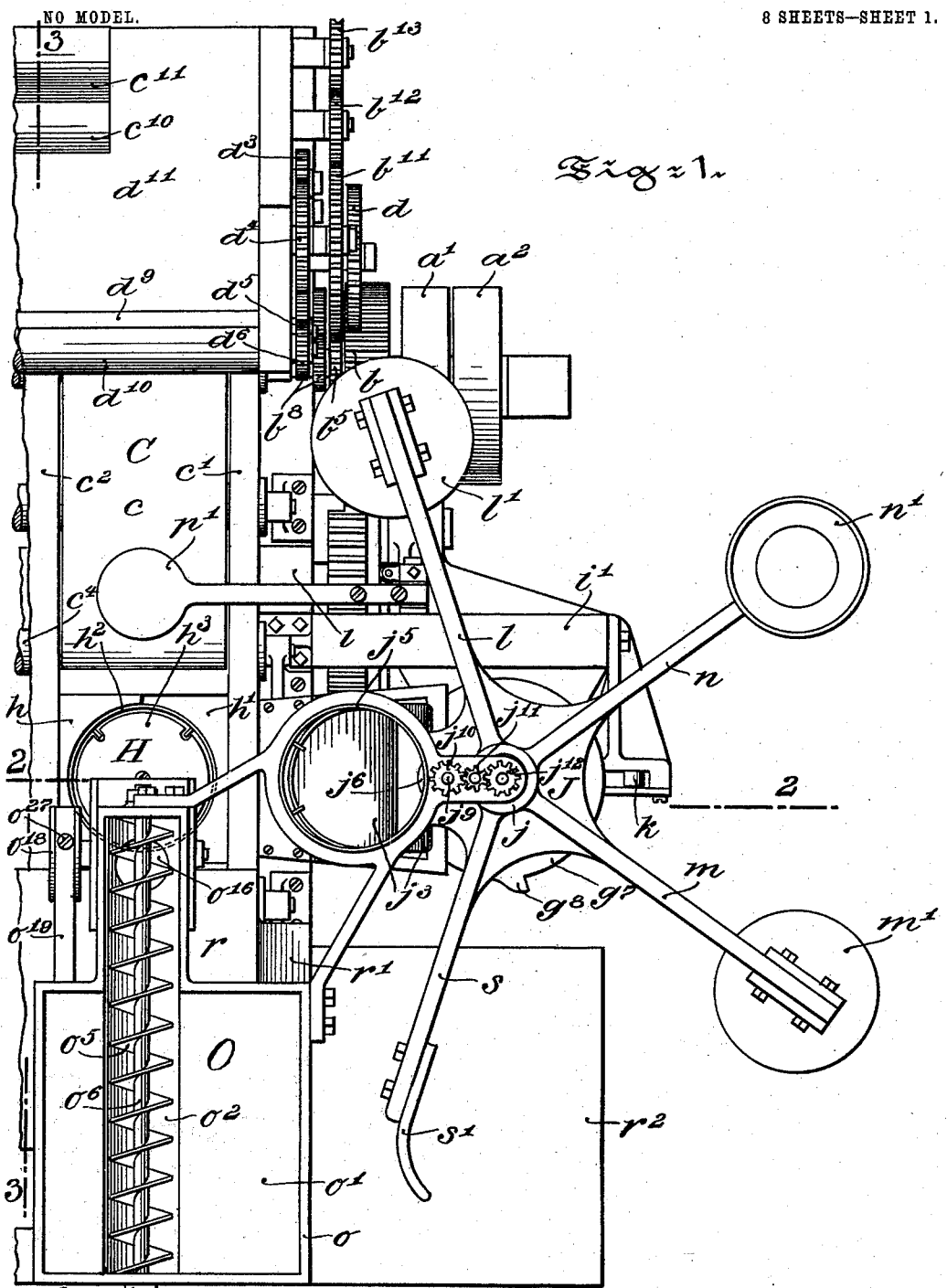

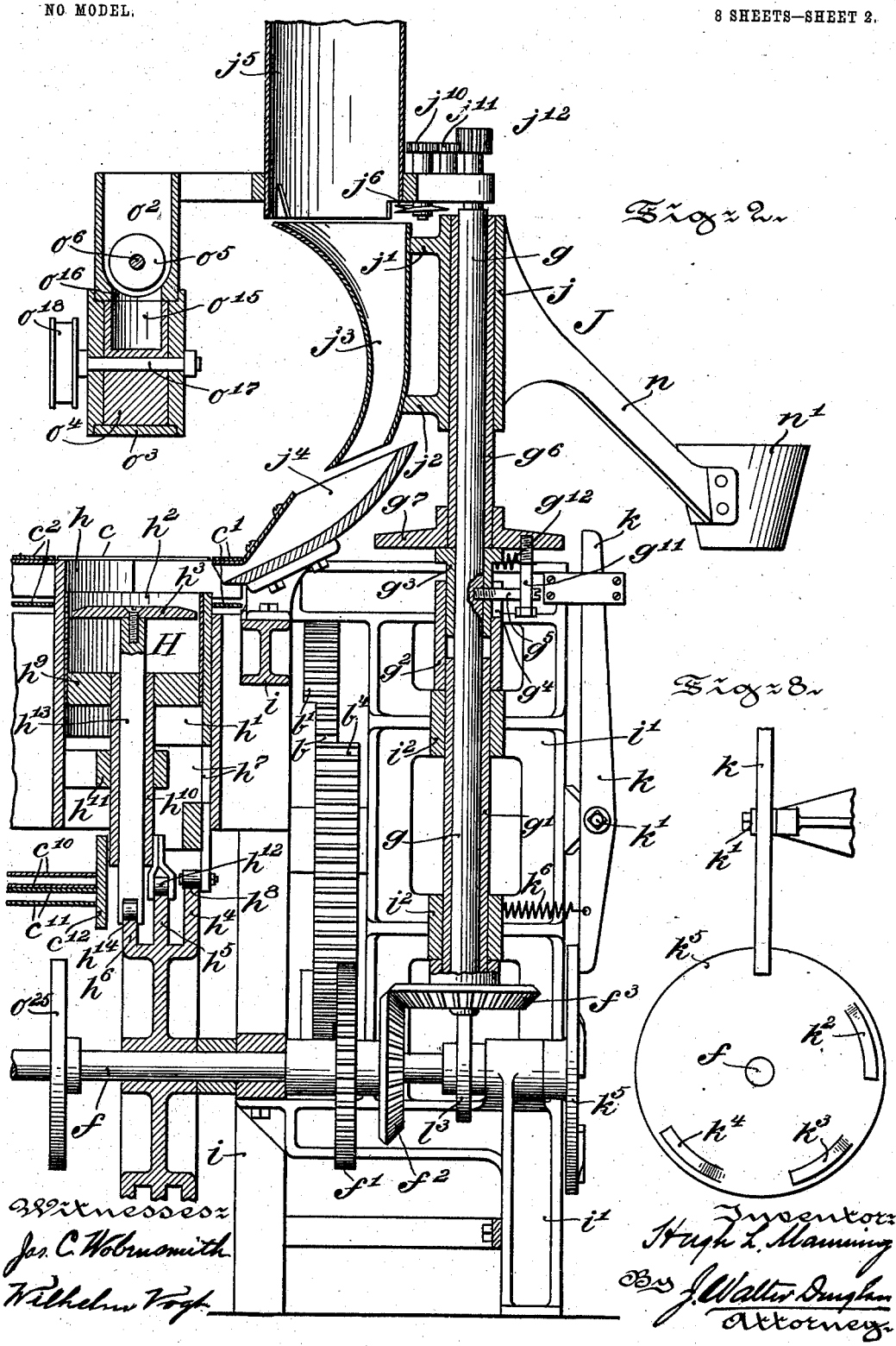

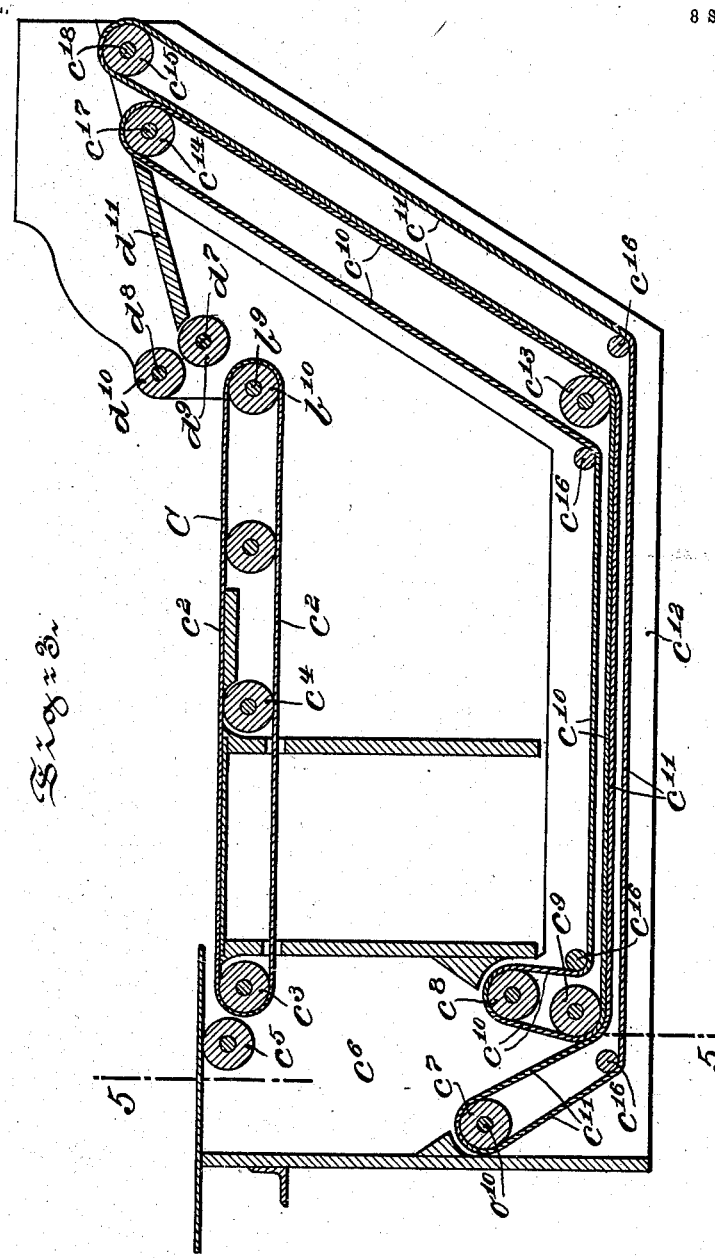

No. 748,392. PATENTED DEC. 29, 1903.
H. L. MANNING.
PIE MAKING MACHINE.
APPLICATION FILED SEPT. 18, 1903.
NO MODEL. 8 SHEETS—SHEET 5.
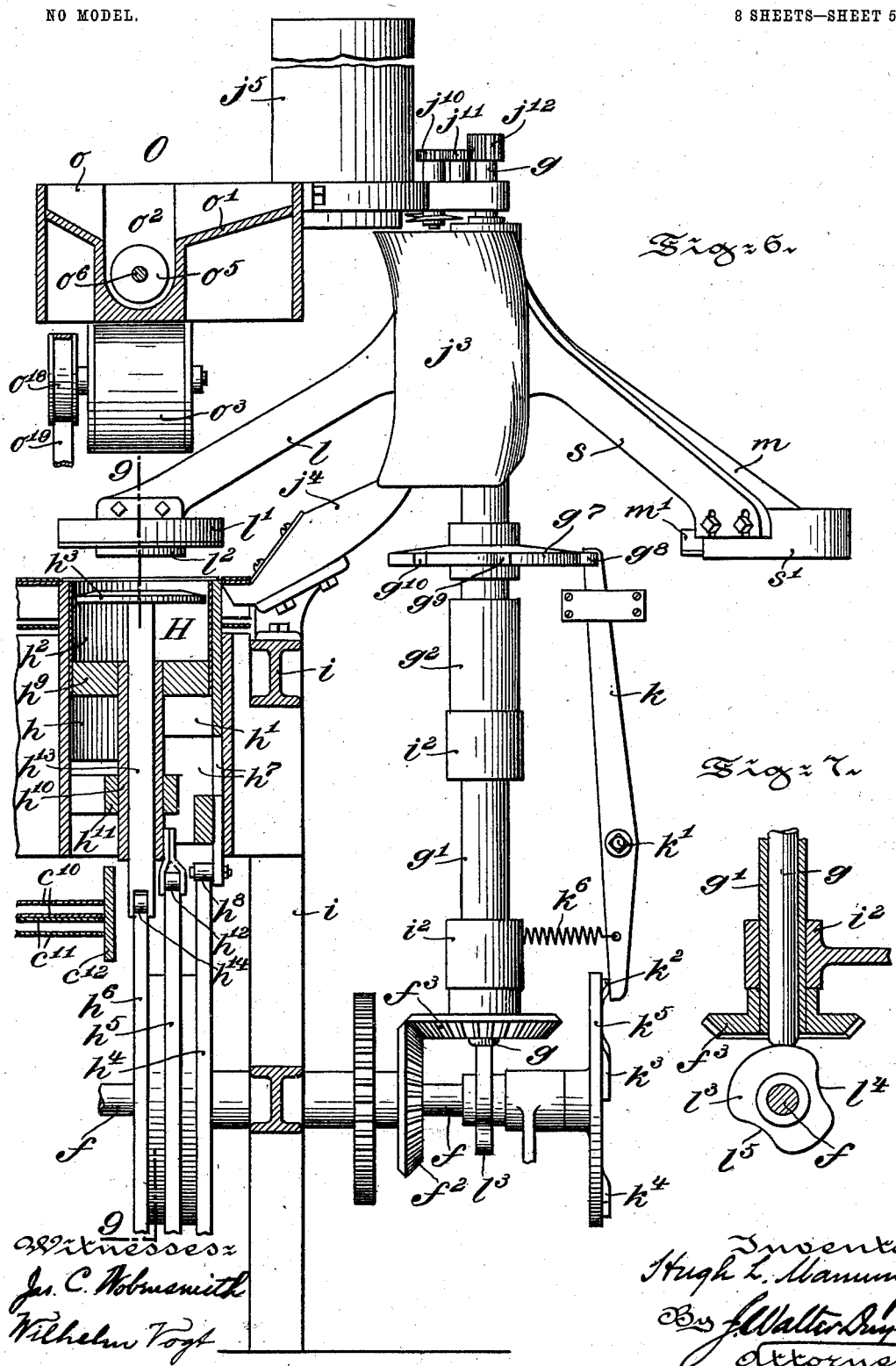
Witnesses:
Jas. C. Robinsmith
Wilhelm Vogt
Inventor:
Hugh L. Manning
By J. Walter Douglas
Attorney

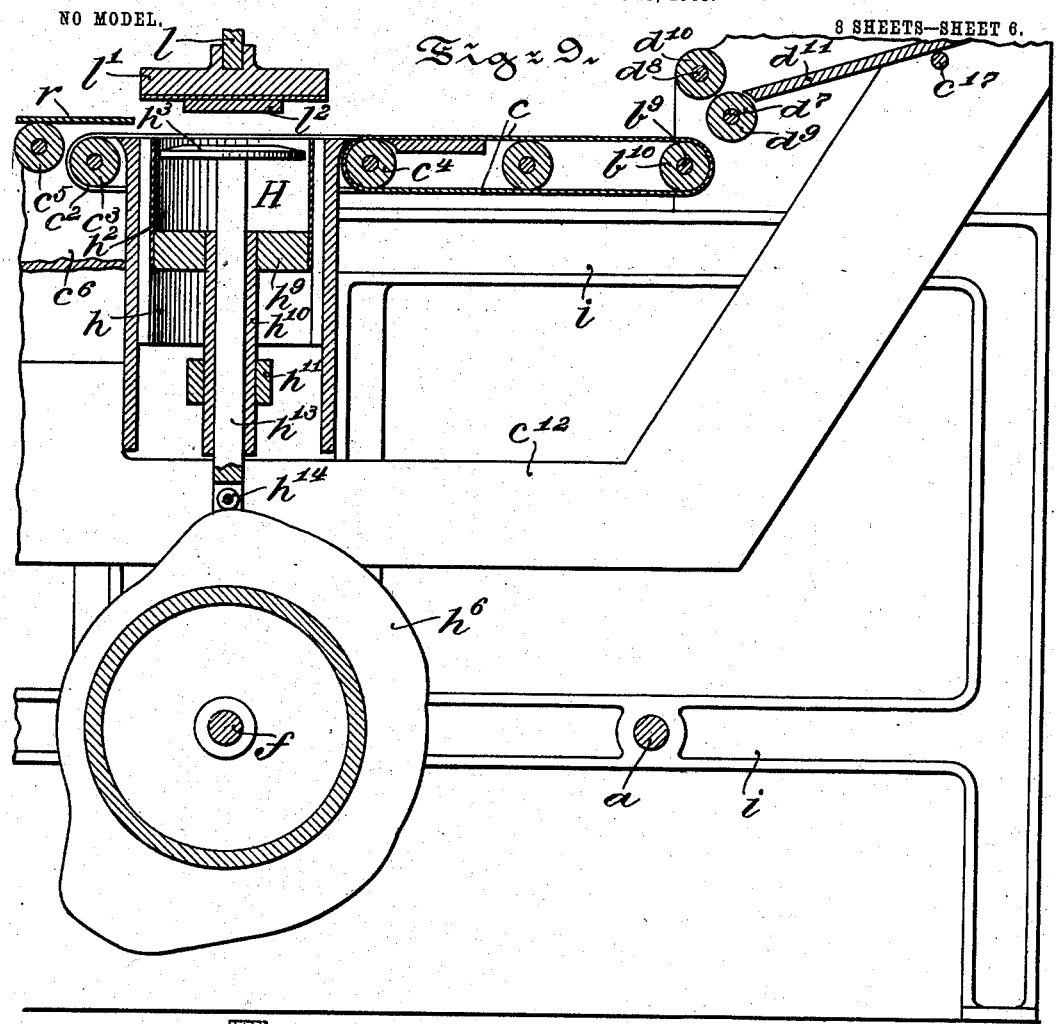

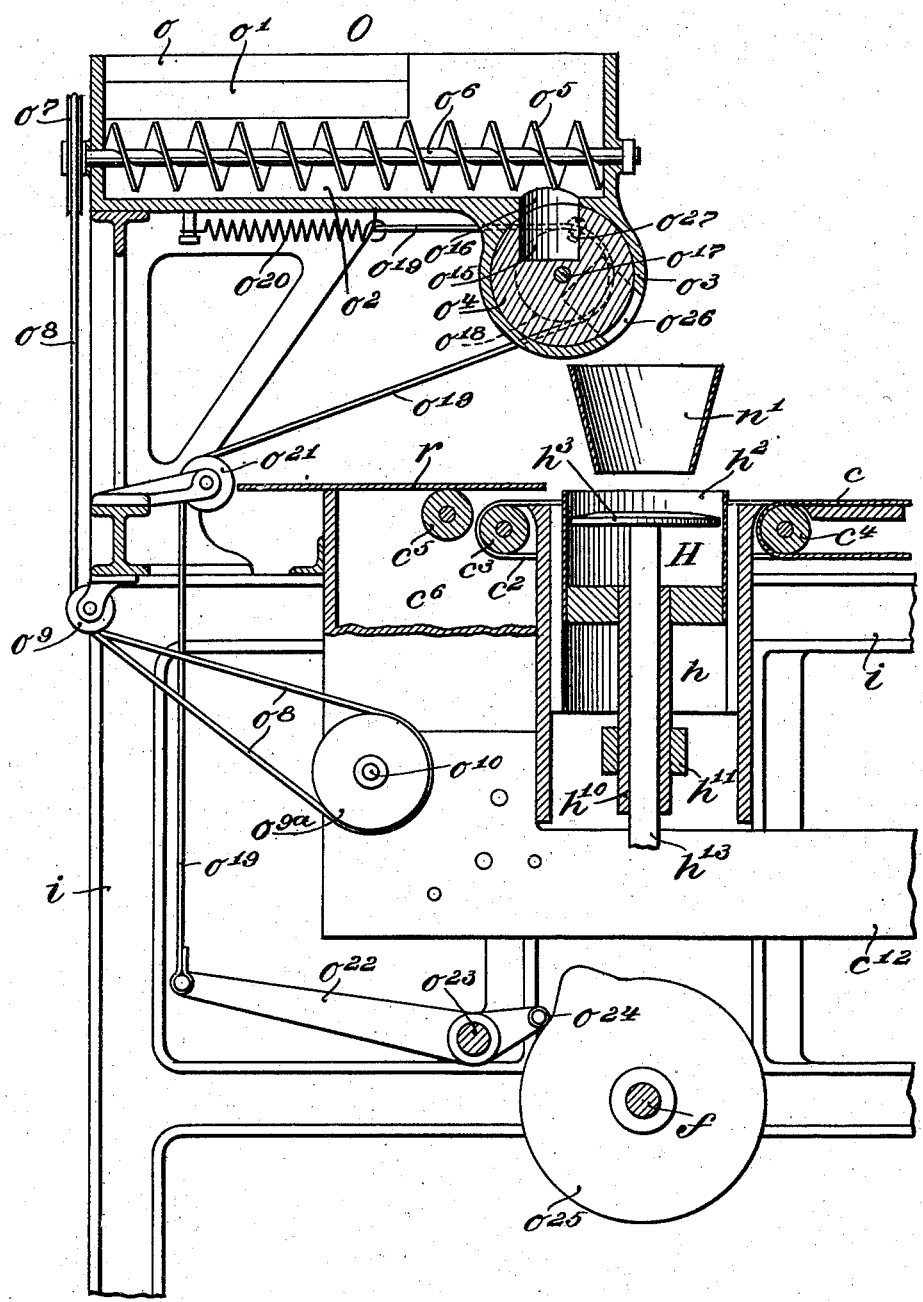

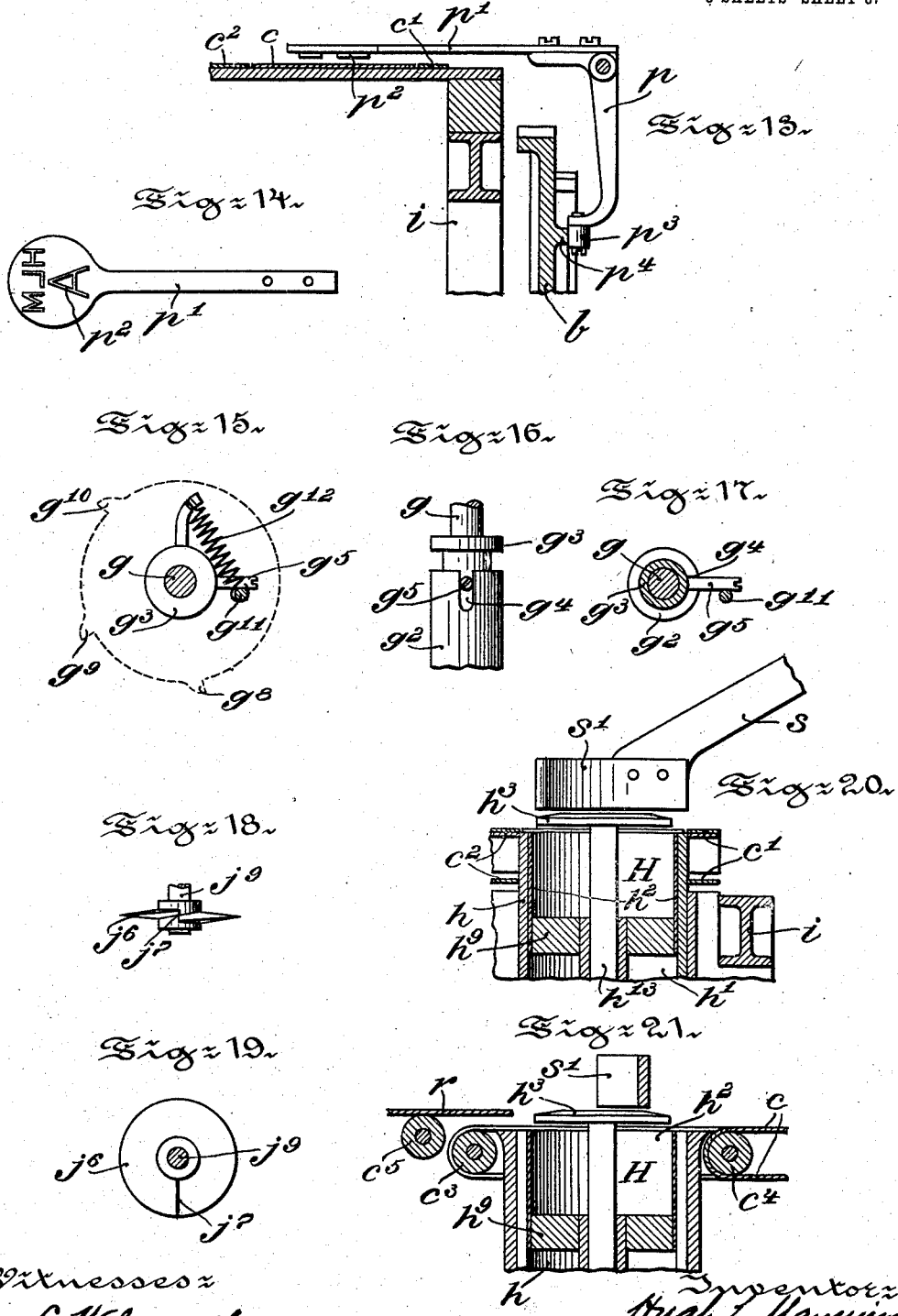

No. 748,392. Patented December 29, 1903.

UNITED STATES PATENT OFFICE.

HUGH L. MANNING, OF PHILADELPHIA, PENNSYLVANIA.

PIE-MAKING MACHINE.

SPECIFICATION forming part of Letters Patent No. 748,392, dated December 29, 1903.

Application filed September 18, 1903. Serial No. 173,658. (No model.)

*To all whom it may concern:*

Be it known that I, HUGH L. MANNING, a citizen of the United States, residing at the city of Philadelphia, in the county of Philadelphia and State of Pennsylvania, have invented certain new and useful Improvements in Pie-Making Machines, of which the following is a specification.

My invention has relation to a machine for making pies, wherein a plate is first fed to a device for holding the pie during the various stages of its production, a sheet of dough being first moved over said holding device and having the lower crust cut therefrom and pressed onto the plate to receive the required quantity of fruit or other matter fed onto the lower crust while in the holding device and the sheet of dough again moved forward and a previously-marked upper crust cut therefrom and pressed into engagement with the edges of the lower crust, when the pie is then removed from the holding device and also from the machine; and in such connection my invention relates to the general construction and arrangement of such a machine for the said uses or purposes.

The principal objects of my invention are, first, to provide a machine for preparing complete a pie containing upper and lower crusts with interposed raw or other materials between said crusts ready for baking; second, to provide a machine of the character described with means for holding the pie during the successive necessary manipulations to form the same into the article required ready for baking; third, to provide a machine of the character described with means for feeding plates to the device for holding during the various manipulations of the materials to constitute the completed pie; fourth, to provide a machine of the character described with means for continuously rolling a sheet of dough and intermittently feeding the sheet to the device for holding the materials to constitute the pie during the different manipulations necessary in the production of the complete pie ready for baking; fifth, to provide means for cutting the crust for the formed pie and pressing the same to place to constitute the completed pie after being filled; sixth, to provide means for feeding a predetermined quantity of fruit or other matter onto the lower crust held in the holding device of the machine; seventh, to provide a machine of the character described with means for marking the upper crust of the formed pie with suitable characters, and, eighth, to provide a machine of the character described with means for removing the completed pie ready for baking from the machine.

The nature and scope of my present invention will be more fully understood from the following description, taken in connection with the accompanying drawings, forming part hereof, in which—

Figure 1 is a top or plan view of a machine embodying main features of my invention. Fig. 2 is a vertical sectional view taken on the line 2 2 of Fig. 1. Fig. 3 is a longitudinal sectional view taken on the line 3 3 of Fig. 1, illustrating the means for rolling the sheet of dough, for feeding the sheet of dough, and for returning the scrap-dough to the dough platform or receptacle. Fig. 4 is a view, partly in elevation and partly in section, showing the driving mechanism of the machine. Fig. 5 is a transverse sectional view taken on the line 5 5 of Fig. 3. Fig. 6 is a view, partly in elevation and partly in section, somewhat similar to Fig. 2, but showing the parts of the machine in the positions assumed just prior to the operation of cutting the lower crust. Figs. 7 and 8 are respectively views of details of certain mechanisms of the machine. Fig. 9 is a sectional view taken on the line 9 9 of Fig. 6. Figs. 10 and 11 are sectional views enlarged, illustrating in detail, respectively, certain of the means for pressing the lower and upper crusts of the formed pie to place. Fig. 12 is a sectional view through the filler or fruit-reservoir and fruit or filler device. Fig. 13 is a detail view of the marking device. Fig. 14 is an underneath plan view of a removable marker used in the machine. Figs. 15, 16, and 17 are detail views of mechanisms of the machine for the performance of certain operations in the machine. Figs. 18 and 19 are respectively elevation and plan views, enlarged, of a device employed in the mechanism for feeding the plates in the machine; and Figs. 20 and 21 are sectional views illustrating the means for removing the completed pie from the holding device and from the machine.

In the drawings has been shown along the left-hand side of the machine a broken line. It is to be understood from this broken line that in the preferred form of construction of the machine there are two machines built in one, in which one is a duplicate of the other; but for convenience of illustration and to enable the drawings to be made on a larger scale but one-half of this double machine only has been illustrated.

Referring now to the drawings, the machine has arranged on the driving-shaft $a$ the ordinary fast and loose pulleys $a'$ $a^2$. Secured to the driving-shaft $a$ is a gear-wheel $a^3$, which meshes with and drives a gear $b$ and through which gear $b$ the various mechanisms of the machine are driven. Extending from either side of the gear-wheel $b$ are extensions $b'$ $b^2$ and $b^3$ $b^4$ of certain of the teeth of the gear-wheel $b$. The extensions $b'$ $b^2$ on the inner side of the gear $b$ are arranged to mesh with and drive at proper intervals a gear $b^5$, and said gear through the train of gears $b^6$ and $b^7$ driving the gear $b^8$, mounted on the shaft $b^9$ of a roller $b^{10}$. Passing around the roller $b^{10}$ and across the machine is a belt or apron C, composed of strips $c$, $c'$, and $c^2$, this apron serving to feed the sheet of dough across the machine, as will presently be more fully explained. Meshing with the gear $b^5$ is an idler-gear $b^{11}$, serving to operate the gears $b^{12}$ and $b^{13}$ and to drive the scrap-dough-returning device, in a manner to be presently more fully described. Meshing with the central or continuous portion of the gear $b$ is a gear $d$, serving to drive through the intervention of the gears $d'$ $d^2$ $d^3$ $d^4$ a pair of gears $d^5$ and $d^6$, mounted, respectively, on the shafts $d^7$ and $d^8$ of the rolls $d^9$ and $d^{10}$. These rolls $d^9$ and $d^{10}$ are arranged at the edge of an inclined platform $d^{11}$, upon which is placed the dough for forming the crusts of the pie to be produced. It is necessary that the rolls $d^9$ and $d^{10}$ for rolling the crust be driven continuously, and as the sheet of dough is fed intermittently it will be apparent that the gearing for driving the rolls $d^9$ and $d^{10}$ must be so related to the gearing for driving the apron C that the total peripheral speed of the rolls $d^9$ and $d^{10}$ must correspond to the total amount of advance of the apron C. The gears shown in Fig. 4 are therefore designed with this end in view and to accomplish the results in the operation of the machine. When the extensions $b'$ and $b^2$ of the gear $b$ are not in engagement with the gear $b^5$, and the sheet of dough is therefore not being fed across the machine, then the extension $b^3$ or $b^4$ of the gear $b$ engages and drives the gear $f'$, mounted on the shaft $f$, arranged transversely in the lower part of the machine. The shaft $f$ carries a bevel-gear $f^2$, meshing with a bevel-gear $f^3$, which serves to drive the vertical shaft $g$, carrying the various instrumentalities and mechanisms necessary to complete the pie for removal from the machine ready for baking.

Arranged above the shaft $f$ is the device H for holding the pie being formed during successive manipulations necessary to complete same. The apron C for carrying the sheet of dough to the holding device H is, as hereinbefore described, made up of strips $c$, $c'$, and $c^2$, and of these strips $c'$ and $c^2$ pass beyond the holding device H and over the roller $c^3$ and then return to the driving-roller $b^{10}$, while the strip $c$, of about the width of the holding device H, passes over a roller $c^4$, placed just before the holding device H, as illustrated in Figs. 1 and 9. This arrangement permits of the cutting of the crusts from the sheet of dough and at the same time allows the scrap-dough to be conveyed away from the holding device H and at the proper time of the presentation of a fresh portion of the sheet of dough for cutting out of another crust from the same. To return the scrap-dough to the dough-platform $d^{11}$, the following preferred mechanism (illustrated in Fig. 3) is employed: Adjacent to the roller $c^3$, over which the strips $c'$ and $c^2$ of the apron C passes before returning to the driving-roller $b^{10}$, is placed a loosely-mounted roller $c^5$, which serves to deflect the sheet of scrap-dough downward into a box $c^6$, at the bottom of which is arranged, preferably, three loosely-mounted rollers $c^7$, $c^8$, and $c^9$. The rollers $c^7$ and $c^8$ are arranged at the sides of the bottom of the box $c^6$, and over each of said rollers passes one of the endless belts or aprons $c^{10}$ $c^{11}$. These belts or aprons meet at the center of the bottom of the box $c^6$ and pass over the roller $c^9$, so as to grip the scrap-dough between the belts $c^{10}$ $c^{11}$ and convey the same to the dough-platform $d^{11}$. After passing over the roller $c^9$ the belts $c^{10}$ $c^{11}$ pass along the lower part of the machine, confined at their edges by suitable walls $c^{12}$, and then pass around the roller $c^{13}$, then travel in an inclined upward direction to the respective driving-rollers $c^{14}$ $c^{15}$, located adjacent to the dough-platform $d^{11}$, where said belts $c^{10}$ $c^{11}$ diverge and deliver the scrap-dough to the platform $d^{11}$, to be again rolled into a fresh sheet of dough. After passing over the driving-rollers $c^{14}$ $c^{15}$ the belts $c^{10}$ $c^{11}$ return to the rollers $c^7$ $c^8$ at the other end of the machine, being suitably guided in their return by rollers $c^{16}$, placed at proper points. The driving-rollers $c^{14}$ $c^{15}$ are mounted on shafts $c^{17}$ $c^{18}$, carrying at their respective ends the hereinbefore-described gears $b^{12}$ $b^{13}$, driven by the extensions $b'$ and $b^2$ of the gear-wheel $b$ through the intervention of the gears $b^5$ and $b^{11}$, as shown in Fig. 4. The belts $c^{10}$ $c^{11}$ will therefore only be driven while the sheet of uncut dough is being fed across the machine.

The device H for holding the materials with their filler to become a pie during the different manipulations necessary to form the pie consists, essentially, of a stationary block $h$ and a vertically-movable block $h'$, arranged adjacent to each other and having their contiguous faces cut away to form a cylindrical opening in which is arranged a sheet-metal annulus $h^2$, having a range of vertical movement therein and within which is a vertically-movable bottom $h^3$. The movable blocks $h'$, sheet-metal annulus $h^2$, and movable bottom $h^3$ are each required during the production of a pie to assume various positions with relation to each other under the influence, respectively, of the cams $h^4$, $h^5$, and $h^6$, carried by the shaft $f$, arranged transversely in the machine. The movable block $h'$ has extending from the lower portion thereof a framework $h^7$, carrying a roller $h^8$, resting on the cam $h^4$. The sheet-metal annulus $h^2$ is carried by a substantial bottom piece $h^9$, said bottom piece being carried by a sleeve $h^{10}$, guided in a suitable bracket $h^{11}$, and carrying at its lower end a roller $h^{12}$, resting on the cam $h^5$. The movable bottom $h^3$ is supported by a column $h^{13}$, arranged within the sleeve $h^{10}$, and carries at its lower end a roller $h^{14}$, resting on the cam $h^6$.

Referring now more particularly to Fig. 2, the shaft $f$, arranged transversely in the lower part of the machine, carries, as hereinbefore explained, a bevel-gear $f^2$, which meshes with a bevel-gear $f^3$, serving to rotate the vertical shaft $g$, which carries the various tools and devices necessary to form the pie. The bevel-gear $f^3$ is secured to a sleeve $g'$, surrounding the shaft $g$, and within which sleeve the shaft $g$ is permitted to move vertically for a purpose to be presently more fully explained. This sleeve $g'$ is supported in suitable bearings $i^2$, carried by an extension $i'$ of the frame $i$ of the machine. Secured to the upper end of the sleeve $g'$ is a collar $g^2$, surrounding a bushing $g^3$, secured to the vertical shaft $g$. The collar $g^2$ has cut therein a vertical slot $g^4$, through which passes a pin $g^5$, screwed into the bushing $g^3$, and shaft $g$. This arrangement permits of the shaft $g$ being afforded a slight vertical movement and to rotate with the sleeve $g'$.

Loosely mounted on the shaft $g$ and resting upon the bushing $g^3$ is a sleeve $g^6$, carrying at its upper end a device J for carrying the various tools and appliances necessary to form the pie. The device J comprises a sleeve $j$, surrounding the sleeve $g^6$, and having projections and radial arms to which the said tools and appliances are secured, as illustrated in Figs. 1 and 2. To the lower end of the sleeve $g^6$ is secured a disk $g^7$, having arranged on its periphery radial projections $g^8$, $g^9$, and $g^{10}$ for a purpose to be presently more fully explained. Depending from the lower face of the disk $g^7$ is a projecting bolt $g^{11}$, adapted under the tension of a spring $g^{12}$ to rotate the sleeve $g^6$ and the various devices carried thereby with the shaft $g$, upon which the sleeve $g^6$ is loosely mounted, yet permitting of the rotation of the sleeve $g^6$ being arrested for a short interval when certain of the devices carried by said sleeve are located over and are performing their functions in connection with the holding device H. To arrest the rotation of the sleeve $g^6$, there is provided a lever $k$, pivoted, as at $k'$, the upper end of which is adapted to be swung into the path of the projections $g^8$, $g^9$, and $g^{10}$ at the proper times by the cam projections $k^2$, $k^3$, and $k^4$ upon the face of a disk $k^5$, which is mounted on the transverse shaft $f$. The lever $k$ is held in engagement with the face of the disk $k^5$ by means of a spring $k^6$, which spring causes the upper end of the lever $k$ to swing out of the path of the projections $g^8$, $g^9$, and $g^{10}$ after the respective devices controlled by these projections have performed their functions. After the projections $g^8$, $g^9$, and $g^{10}$ have been released from engagement with the lever $k$ the spring $g^{12}$ will cause the sleeve $g^6$ to rotate faster than the shaft $g$ to regain the relative positions of said sleeve and shaft; but the sleeve $g^6$ is prevented from rotating to a position in advance of its proper position with respect to the shaft $g$ by making the pin $g^5$, projecting from the shaft $g$, of sufficient length to lie in the path of rotation of the bolt $g^{11}$, depending from the lower face of the disk $g^7$, secured to the lower end of the sleeve $g^6$.

To feed the plates to the device for holding the pie during the various stages of production, there is provided the following mechanism: The sleeve $j$ of the device J has lugs $j'$ and $j^2$ projecting therefrom. These lugs $j'$ and $j^2$ carry a chute $j^3$, which flares at the top and curves from the sleeve $j$ at the bottom. At the proper time during the rotation of the device J the chute $j^3$ will form a continuation of a stationary chute $j^4$, secured to the framework of the machine. Located above the stationary chute $j^4$ is a cylindrical receptacle $j^5$, serving as a reservoir for the empty plates and having at the lower end thereof means for feeding the plates singly and at the proper time, comprising a circular plate $j^6$, split radially, as at $j^7$, and having its edge bent into helical shape, as illustrated in Figs. 18 and 19. This plate $j^6$ is mounted on a shaft $j^9$, having a gear $j^{10}$ secured to the other end thereof. This gear $j^{10}$ meshes with an idler-gear $j^{11}$, which in turn meshes with a gear $j^{12}$, mounted on the upper end of the shaft $g$. When the shaft $g$ rotates, the plate $j^6$ will therefore rotate in unison with it, and at the moment when the chute $j^3$ is located beneath the pie-plate receptacle $j^5$ the split portion $j^7$ of the helical edge of the plate $j^6$ will release a pie-plate from the receptacle $j^5$, but will engage the next succeeding plate and prevent the same from falling. The stationary chute $j^4$ has its lower end made so as to project between the strip $c'$ of the apron C, and when the chute $j^3$ registers with the chute $j^4$ and the receptacle $j^5$ and a plate is about to be released the cams $h^4$, $h^5$, and $h^6$ will permit the block $h'$, sheet-metal annulus $h^2$, and movable bottom $h^3$ to fall below the end of the chute $j^4$, as illustrated in Fig. 2, so that the pie-plate when released will fall into the sheet-metal annulus $h^2$ and rest on the movable bottom $h^3$.

The mechanism for cutting the lower crust and pressing into its proper place on the plate is as follows: Extending from the sleeve $j$ is a radial arm $l$, carrying at its extremity a horizontally-disposed disk $l'$, having on its lower face a protruding smaller disk $l^2$. The disk $l'$ is so arranged that at a certain time in the rotation of the shaft $g$ it will be brought over the device H, into which a plate has already been deposited and over which a fresh portion of the sheet of dough has been carried by the apron C. The cam $h^5$ will now cause the sheet-metal annulus $h^2$ to rise slightly above the level of the apron C to the position shown in Fig. 10. The disk $l'$ will now descend and acting in conjunction with the sheet-metal annulus $h^2$ will cut a circular crust from the sheet of dough and press the same onto the pie-plate $y$, resting on the movable bottom $h^3$, as illustrated in Fig. 10. As hereinbefore described, the sleeve $g^6$, carrying the device J, rests upon the bushing $g^3$, secured to the shaft $g$, and it is therefore evident that when the shaft $g$ rises or falls the device J and the various appliances carried by the same will rise and fall with the shaft $g$. To cause the disk $l'$ to descend to cut the lower crust, there is therefore provided at the lower end of the shaft $g$ a cam $l^3$, mounted on the shaft $f$ and having portions cut away, as at $l^4$ and $l^5$, to allow the device J to descend during the cutting, respectively, of the lower and upper crusts.

The mechanism for cutting the upper crust is similar to that for cutting the lower crust. Extending from the sleeve $j$ is a radial arm $m$, carrying at its extremity a disk $m'$, having its lower face of the desired shape for pressing the upper crust to its proper place after cutting the same from the sheet of dough. Extending from the sleeve $j$ is another radial arm $n$, carrying at its extremity a funnel $n'$, so arranged as to be brought over the device H after the lower crust has been cut and pressed onto the pie-plate and forming the means of guiding the fruit or other matter into the lower crust from the fruit or other matter reservoir and measuring device. It is necessary that the disks $l'$ and $m'$ and funnel $n'$ be arrested in their rotation about the shaft $g$ for a short interval while performing their functions in connection with the device H, and for this purpose the mechanism, as already described, consists of the disk $g^7$, radial projections $g^8$, $g^9$, and $g^{10}$ on the periphery of said disk, lever $k$, and the means for operating said lever.

The fruit or other matter reservoir and feeding device O are shown more particularly in Figs. 1, 2, 6, and 12. This device O comprises a shallow box $o$, having a slightly-sloping bottom $o'$, draining into a channel $o^2$, running lengthwise through the box $o$ and extending to a point above the pie-holding device H, where it terminates in a cylindrical chamber $o^3$, in which is arranged the measuring and feeding block $o^4$. Throughout the length of the channel $o^2$ is located a screw conveyer or agitator $o^5$, somewhat smaller than the channel $o^2$, mounted on a shaft $o^6$, having at the end thereof a pulley $o^7$, over which passes the belt $o^8$. This belt also passes over suitable idler-pulleys $o^9$ and a driving-pulley $o^{9a}$, located on the end of the shaft $o^{10}$ of the roller $c^7$ of the device for returning the scrap-dough to the dough-platform. As the roller $c^7$ will only rotate while the scrap dough is being returned to the dough platform the screw conveyer will therefore only rotate intermittently. The measuring and feeding block $o^4$ is cylindrical in shape and has on its periphery a cup-shaped opening $o^{15}$ of sufficient capacity to contain enough fruit or other matter for one complete pie.

This cup-shaped opening $o^{15}$ communicates normally with the channel $o^2$ through an opening $o^{16}$ in the bottom thereof. Through the center of the block $o^4$ passes a shaft $o^{17}$ to which said block is secured, and at the end of the shaft $o^{17}$ is fastened a pulley $o^{18}$. Over the pulley $o^{18}$ and fastened thereto by suitable means, such as a screw $o^{27}$, at the proper point on the periphery of the pulley $o^{18}$ passes a strap $o^{19}$. One end of the strap $o^{19}$ is under the tension of a spring $o^{20}$, while the other end of said strap passes over a guide-pulley $o^{21}$ and is fastened to one end of a lever $o^{22}$, pivoted on a shaft $o^{23}$ and carrying at its other end a roller $o^{24}$, held in engagement with a cam $o^{25}$ by means of the spring $o^{20}$. When the funnel $n'$ is arrested in its rotation about the shaft $g$ and is located over the device H, the throw portion of the cam $o^{25}$ will cause the block $o^4$ to be rotated about its axis until the cup-shaped opening $o^{15}$ registers with an opening $o^{26}$ in the chamber $o^3$, whereby the contents of the cup-shaped opening $o^{15}$ will be discharged onto the lower crust of the pie through the funnel $n'$, as illustrated in Fig. 12.

To distinguish what fruit or other matter the pie contains after it is formed and baked, it is necessary to mark the upper crust with suitable characters, for which purpose the following mechanism is provided: To the extension $i'$ of the frame $i$ of the machine is pivoted a bell-crank lever $p$, upon the horizontal arm of which is removably secured the paddle-like marking device $p'$, having on its under face the characters $p^2$, indicating the kind of fruit or other matter contained in the pie, as well as any other characters the manufacturer might care to impress on the upper crust of the pies produced in the machine. At the end of the vertical arm of the bell-crank lever $p$ is a roller $p^3$, bearing against an annular rim $p^4$, projecting from the web of the gear $b$ and having a throw portion $p^5$, as illustrated in Fig. 4, to cause the marking device $p'$ to impress its characters upon the sheet of dough on the portion from which the upper crust is subsequently to be cut.

To remove the finished pie from the holder H and from the machine, the following mechanism is provided: Arranged to cover the box $c^6$, into which the scrap-dough falls preparatory to being returned to the dough-platform, is a plate $r$, having a portion along the side of the machine bent downward, as at $r'$, toward a table $r^2$. The edge of this plate $r$ perpendicular to the bent portion $r'$ projects to a point contiguous to the holding device H, as clearly shown in the drawings. When the pie is finished and is ready to be removed from the machine, the cam $h^6$ will cause the movable bottom $h^3$ of the holder H to rise to the level of the plate $r$. Extending from the sleeve $j$ of the device J is another radial arm $s$, carrying at its extremity a hook-like device $s'$, adapted when the movable bottom $h^3$ is raised to push or sweep the finished pie from said movable bottom to the plate $r$, thence across the plate $r$ to the inclined portion $r'$, where the pie will slide down and be deposited onto the table $r^2$, from which it can be removed by hand or in any other preferred manner. It will be manifestly obvious that as to the details of construction and arrangement of the machine modifications may be made without departing from the spirit and scope of my said invention, and hence I do not wish to be understood as limiting myself to all the details of arrangement of the machine as hereinbefore described and illustrated; but,

Having thus described the nature and objects of my invention, what I claim as new, and desire to secure by Letters Patent, is—

1. In a machine of the character described, stationary means for holding the elements to form a pie during successive manipulations necessary to complete the same, means for feeding empty plates to the holding means, means for continuously rolling and intermittently feeding a sheet of dough to said holding means, means acting in conjunction with the holding means for cutting crusts from the sheet of dough, means for feeding a predetermined quantity of fruit or other matter to the holding means, and means for removing the finished pie from the holding means and from the machine.

2. In a machine of the character described, a stationary holder for the elements to constitute the pie, means for rolling a sheet of dough, means for intermittently feeding said dough in the form of crusts to said holder and means for feeding the fruit or other filling to the holder during the intermittent feed of said dough.

3. In a machine of the character described, a device for holding the elements to constitute a pie during successive manipulations necessary to complete the same, a platform for holding dough, means located adjacent to said platform for continuously rolling a sheet of dough, means for intermittently feeding said sheet of dough to the holding device and means for returning the scrap-dough from the holding device to the dough-platform.

4. In a machine of the character described, a holding device, a shaft located beneath said holding device and carrying means for operating the constituent parts of said holding device, a shaft carrying tools and appliances for forming a pie and acting in conjunction with the holding device, and means for successively presenting said tools and appliances to said holding device.

5. In a machine of the character described, a holding device, comprising a stationary block, a vertically-movable block having contiguous faces cut away to form a cylindrical opening, an annulus arranged within and vertically movable in said opening, a movable bottom arranged within said annulus and means for operating said movable block, annulus and movable bottom, substantially as and for the purposes set forth.

6. In a machine of the character described, a device for holding the elements necessary to constitute a pie, a receptacle adapted to contain empty pie-plates, means for releasing the pie-plates singly from said receptacle, and means for guiding said pie-plates from said receptacle to the device for holding the elements to constitute a pie, substantially as and for the purposes set forth.

7. In a machine of the character described, a stationary holder for the elements to constitute the pie, combined with means for rolling and feeding a sheet of dough to the holder in the form of crusts, said means comprising a dough-platform, a pair of continuously-driven sheeting-rolls, an apron for intermittently feeding the sheet to the holder, and means for driving said apron so that the total advance of said apron corresponds with the peripheral speed of the sheeting-rolls.

8. In a machine of the character described, a device for holding the elements necessary to constitute a pie, an apron for feeding a sheet of dough to and conveying scrap-dough away from said holding device, comprising a series of strips, whereof certain of said strips travel beyond said holding device and whereof one travels to a point adjacent to said holding device, substantially as and for the purposes set forth.

9. In a machine of the character described, a device for holding the elements necessary to constitute a pie, an apron for feeding a sheet of dough to and conveying scrap-dough away from said holding device, comprising a series of strips, whereof certain of said strips travel beyond said holding device, and whereof one of said strips travels a distance at variance with the travel of the other strips, substantially as and for the purposes set forth.

10. In a machine of the character described, a platform, means for delivering dough to said platform, comprising a box adapted to receive the dough, aprons arranged in said box and converging from the sides of the box to the center thereof to grip the dough and deliver onto said platform.

11. In a machine of the character described, a stationary device for holding elements necessary to constitute a pie, means for feeding a sheet of dough to said stationary holding device, means acting in conjunction with said holding device for cutting a crust from the sheet of dough and pressing onto a plate previously deposited in the holding device, substantially as and for the purposes set forth.

12. In a machine of the character described, a device for holding the elements necessary to constitute a pie, means adapted to contain fruit or other filling material provided with a conveyer or agitator and communicating with a channel in which the conveyer or agitator is mounted for feeding a predetermined quantity of fruit or other material onto the lower crust of a pie held in the holding device of the machine, substantially as and for the purposes set forth.

13. In a machine of the character described, a device for holding the constituents necessary to constitute a pie, means adapted to contain fruit or other filling material provided with a channel-way, a conveyer or agitator mounted in said channel-way and means communicating with said channel-way for measuring and feeding a predetermined quantity of fruit or other material onto one of the crusts of the pie to be formed held by said holding device, substantially as and for the purposes set forth.

14. In a machine of the character described, means adapted to contain fruit or other filling material provided with a channel-way having mounted therein a conveyer or agitator, means communicating with said channel-way for measuring and feeding a predetermined quantity of fruit or other material, and means for intermittently operating said conveyer or agitator, substantially as and for the purposes set forth.

15. In a machine of the character described, a device for holding the constituents necessary to constitute a pie, means adapted to contain fruit or other filling material, means for measuring and feeding said fruit or other material and a movable funnel and its actuating devices adapted to permit of the movement of said funnel into the path of said measuring device to receive a predetermined quantity of said fruit or other material therefrom and permit of the passage of the same through said funnel onto said holding device, substantially as and for the purposes set forth.

16. In a machine of the character described, a device for holding the constituents necessary to constitute a pie, means adapted to contain fruit or other filling material, a measuring device connected with said filling means, a movable funnel adapted to be brought into a position to register with said measuring device so as to permit of the discharge of a predetermined quantity of said fruit or other material into said holding device, substantially as and for the purposes set forth.

17. In a machine of the character described, a stationary device for holding the constituents necessary to constitute a pie, an apron for feeding a sheet of dough to and conveying scrap-dough away from said holding device, means adapted to contain fruit or other filling material, a conveyer or agitator in communication with said filling-material means, measuring means connected with said filling-material means and adapted to feed a predetermined quantity of said filling material to said holding device, a movable funnel interposed between said measuring means and stationary holding device and its actuating devices adapted to register with said measuring device so as to deliver a predetermined quantity of fruit or other material onto the plate held by said holding device, substantially as and for the purposes set forth.

18. In a machine of the character described, a device for holding the constituents necessary to constitute a pie, means adapted to contain fruit or other filling material, a measuring device adapted to register therewith, means interposed between said measuring device and holding device for delivering a predetermined quantity of the fruit or other material into the body of a plate held by said holding device, and means for liberating said plate with its filling material therefrom, substantially as and for the purposes set forth.

19. In a machine of the character described, a stationary device for holding the constituents necessary to constitute a pie, means for delivering plates separately to said holding device, means for feeding a sheet of dough to and conveying scrap-dough away from said device, means adapted to convey fruit or other filling material to said holding device onto a plate adapted to be held thereby, means for measuring and feeding a predetermined quantity of fruit or other material onto the pie-crust of the plate held by said holding device, substantially as and for the purposes set forth.

20. In a machine of the character described, a stationary device for holding the constituents necessary to constitute a pie, means for feeding a sheet of dough to and conveying scrap-dough away from said holding device, container means for a filler material, measuring means in communication with said container means and adapted to deliver said material in predetermined quantity into the holding device onto a sheet of dough on a plate held by said device, and means for releasing the plate containing said formed pie from said holder, substantially as and for the purposes set forth.

21. In a machine of the character described, a device for holding the constituents necessary to constitute a pie, said holding device provided with a movable bottom, means for raising said movable bottom beyond the surface of said device to liberate a pie-plate held thereby from the same, substantially as and for the purposes set forth.

22. In a machine of the character described, a device for holding the constituents necessary to constitute a pie provided with a removable bottom, means for raising said bottom beyond the surface of said device, and means for sweeping a pie-plate raised by said bottom, therefrom, substantially as and for the purposes set forth.

23. In a machine of the character described, a device for holding the constituents necessary to constitute a pie, means for delivering plates singly thereto, said holding device provided with a movable bottom adapted to be elevated and lowered, and means for sweeping the plate from said bottom while elevated, substantially as and for the purposes set forth.

24. In a machine of the character described, a holding device for plates provided with a movable bottom adapted to be raised and lowered, means for feeding a sheet of dough to and conveying scrap dough away from said plate while so held by said bottom, means for delivering a filler material to the dough pressed onto said plate and means for sweeping the plate with the formed pie from said bottom, while elevated, substantially as and for the purposes set forth.

25. In a machine of the character described, a device for holding the constituents necessary to constitute a pie provided with a bottom adapted to be raised and lowered, means for presenting plates singly to said bottom, means for feeding a sheet of dough to said plate, means for presenting in predetermined quantity a filler material onto dough pressed onto said plate, means for presenting a top crust over said filler material, and means for conveying the formed pie and plate from said bottom, while in an elevated position, substantially as and for the purposes set forth.

26. In a machine of the character described, a device for holding the constituents necessary to constitute a pie provided with a bottom adapted to be raised and lowered, means for containing plates and adapted to be successively fed to the bottom of said holding device, means for feeding a sheet of dough to said plate and pressing the same thereon and feeding scrap-dough away therefrom, means for feeding a filler material in measured or predetermined quantity onto the bottom crust or dough contained within said plate, means for delivering a sheet of crust over said filler material and pressing the same onto the plate, and means for liberating or sweeping said plate and pie from said bottom when elevated, substantially as and for the purposes set forth.

27. In a machine of the character described, a stationary holding device provided with a bottom adapted to be intermittently elevated and lowered, a container for plates and means adapted to deliver said plates to the bottom of said holding device separately, and automatic means for liberating the formed pie on said plate from said bottom while in its elevated position, substantially as and for the purposes set forth.

28. In a machine of the character described, a stationary device for holding the constituents necessary to constitute a pie and means adapted to successively conduct said constituents to said holding means to complete the pie, substantially as and for the purposes set forth.

29. In a machine of the character described, a stationary device for holding the constituents necessary to constitute a pie, means adapted to successively conduct said constituents to said holding means to complete the pie and means adapted to liberate the formed pie from said holding device, substantially as and for the purposes set forth.

30. In a machine of the character described, a stationary device for holding the constituents necessary to constitute a pie and said device provided with a bottom adapted to be raised and lowered, means adapted to conduct the different constituents to said holding device, and means adapted to sweep the formed pie therefrom, while the bottom of said holding device is in an elevated position, substantially as and for the purposes set forth.

31. In a machine of the character described, a stationary holder for the elements constituting the pie, means for feeding a sheet of dough to said device, means coöperating with the holder for cutting the sheet into crusts and means for marking the sheet prior to its delivery to the holder.

32. In a machine of the character described, a holder having a stationary peripheral cutting edge, a bottom arranged to receive a pie-plate, means for raising said bottom in said holder to bring said plate in alinement with the cutting edge of the holder, means for feeding a sheet of dough to the plate in said elevated position and a plunger arranged to bear upon the cutting edge of the holder to sever the dough.

In testimony whereof I have hereunto set my signature in the presence of two subscribing witnesses.

HUGH L. MANNING.

Witnesses:
J. WALTER DOUGLASS,
THOMAS M. SMITH.